United States Patent
Zhai

(10) Patent No.: US 10,452,208 B2
(45) Date of Patent: Oct. 22, 2019

(54) TOUCH DISPLAY PANEL AND DISPLAY DEVICE

(71) Applicants: SHANGHAI TIANMA MICRO-ELECTRONICS CO., LTD., Shanghai (CN); TIANMA MICRO-ELECTRONICS CO., LTD, Shenzhen (CN)

(72) Inventor: Yingteng Zhai, Shanghai (CN)

(73) Assignees: SHANGHAI TIANMA MICRO-ELECTRONICS CO., LTD., Shanghai (CN); TIANMA MICRO-ELECTRONICS CO., LTD., Shenzhen (CN)

( * ) Notice: Subject to any disclaimer, the term of this patent is extended or adjusted under 35 U.S.C. 154(b) by 319 days.

(21) Appl. No.: 14/997,153

(22) Filed: Jan. 15, 2016

(65) Prior Publication Data
US 2016/0291725 A1    Oct. 6, 2016

(30) Foreign Application Priority Data

Apr. 1, 2015    (CN) .......................... 2015 1 0152700

(51) Int. Cl.
    *G06F 3/044*    (2006.01)
    *G06F 3/041*    (2006.01)

(52) U.S. Cl.
    CPC ............ *G06F 3/044* (2013.01); *G06F 3/0412* (2013.01); *G06F 3/0416* (2013.01); *G06F 2203/04103* (2013.01)

(58) Field of Classification Search
    CPC ...... G06F 3/044; G06F 3/0412; G06F 3/0416; G06F 2203/04103
    See application file for complete search history.

(56) References Cited

U.S. PATENT DOCUMENTS

2010/0059294 A1* 3/2010 Elias ...................... G06F 3/0416
                                                        178/18.06
2012/0319991 A1* 12/2012 Yang ........................ G06F 3/044
                                                        345/174

(Continued)

FOREIGN PATENT DOCUMENTS

CN    102914893 A    2/2013
CN    103197796 A    7/2013

(Continued)

OTHER PUBLICATIONS

Chinese Application No. 201510152700.7, First Office Action dated Mar. 20, 2017.

(Continued)

*Primary Examiner* — Stephen G Sherman
(74) *Attorney, Agent, or Firm* — Alston & Bird LLP

(57) ABSTRACT

A touch display panel is provided. The touch display panel includes a touch electrode layer and a plurality of first signal lines, where the touch electrode layer includes a plurality of first electrode blocks, and each of the first electrode blocks is electrically connected to a corresponding first signal line. The touch display panel further includes a plurality of second signal lines, where a projection region of the first electrode block in a direction perpendicular to the touch display panel includes at least one second signal line, and the second signal line is insulated from the first electrode block.

14 Claims, 5 Drawing Sheets

(56) References Cited

U.S. PATENT DOCUMENTS

| | | | |
|---|---|---|---|
| 2013/0033439 A1* | 2/2013 | Kim | G02F 1/13338 |
| | | | 345/173 |
| 2014/0009442 A1 | 1/2014 | Kim | |
| 2014/0146246 A1 | 5/2014 | Ma et al. | |
| 2014/0162057 A1* | 6/2014 | Cho | C09J 4/06 |
| | | | 428/339 |
| 2015/0049050 A1 | 2/2015 | Zhao | |
| 2015/0145802 A1* | 5/2015 | Yao | G06F 3/0416 |
| | | | 345/174 |
| 2015/0227229 A1* | 8/2015 | Schwartz | G06F 3/044 |
| | | | 345/174 |
| 2016/0048233 A1 | 2/2016 | Wang et al. | |
| 2016/0098116 A1* | 4/2016 | Park | G06F 3/0418 |
| | | | 345/174 |
| 2016/0282976 A1 | 9/2016 | Yang et al. | |

FOREIGN PATENT DOCUMENTS

| | | |
|---|---|---|
| CN | 103279237 A | 9/2013 |
| CN | 104020907 A | 9/2014 |
| CN | 104020912 A | 9/2014 |

OTHER PUBLICATIONS

Chinese Application No. 201510152700.7, Second Office Action dated Oct. 23, 2017.

* cited by examiner

TOUCH DISPLAY PANEL AND DISPLAY DEVICE

CROSS REFERENCE TO RELATED APPLICATION

The present application claims the priority to Chinese Patent Application No. 201510152700.7, titled "TOUCH DISPLAY PANEL AND DISPLAY DEVICE", filed on Apr. 1, 2015 with the State Intellectual Property Office of People's Republic of China, which is incorporated herein by reference in its entirety.

FIELD OF THE INVENTION

The disclosure relates to the field of liquid crystal display device, and in particular to a touch display panel and a display device with the touch display panel.

BACKGROUND OF THE INVENTION

In a conventional self-capacitive touch display panel, when performing the touch detection, the signal line connected to touch electrodes is used to transmit both drive signal and sensing-detection signal. For a touch electrode, the transmission of drive signal and sensing-detection signal is implemented through a same signal line, thus, for a conventional self-capacitive touch display panel, the drive signal and sensing-detection signal need to be transmitted in time-sharing manner, which causes a longer time consumed in touch detection and is disadvantageous for improving the efficiency of touch detection.

BRIEF SUMMARY OF THE INVENTION

In view of this, a touch display panel and a display device with the touch display panel are provided according to the embodiments of the disclosure, to realize the simultaneous transmission of drive signal and sensing-detection signal, and reduce the time consumed in touch detection.

To solve the above technical problem, the following technical solution is provided according to the embodiments of the disclosure.

A touch display panel includes a touch electrode layer and a plurality of first signal lines, where the touch electrode layer comprises a plurality of first electrode blocks, and each of the first electrode blocks is electrically connected to a corresponding first signal line, and the touch display panel further includes:

A plurality of second signal lines, where a projection region of the first electrode block in a direction perpendicular to the touch display panel includes at least one second signal line, and the second signal line is insulated from the first electrode block.

A display device includes the foregoing touch display panel.

Compared to conventional technology, the present disclosure has following beneficial effect.

In the touch display panel according to the embodiments of the disclosure, a plurality of first signal lines are provided, and each first signal line is electrically connected to a corresponding touch electrode. In addition, a plurality of second signal lines are provided in the touch display panel, and a projection of each touch electrode in a direction perpendicular to the touch display panel includes at least one of the second signal lines, where the second signal line is insulated from the touch electrode, thus, a mutual capacitor is formed between the second signal line and the first signal line.

The first signal line is used to transmit the sensing signal, and the second signal line is used to transmit the drive signal. The first signal line and the second signal line are two different lines, thus, in the touch display panel according to the embodiments of the disclosure, the drive signal and sensing signal may be transmitted simultaneously, and the efficiency of touch detection is improved.

BRIEF DESCRIPTION OF THE DRAWINGS

In order to illustrate the technical solutions according to the embodiments of the disclosure or in the conventional technology more clearly, the drawings to be used in the description of the embodiments or the conventional technology are described briefly hereinafter. Apparently, the drawings described hereinafter are only some embodiments of the present disclosure, and other drawings may be obtained by those skilled in the art according to the provided drawings without any creative effort.

DETAILED DESCRIPTION OF THE INVENTION

Figure 1:
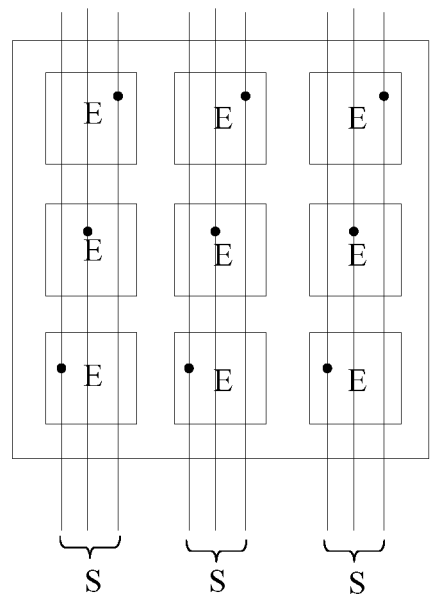
FIG. 1 is a plan view of a self-capacitive touch display panel in conventional technology.

FIG. 1 is a plan view of a self-capacitive touch display panel in conventional technology. As shown in FIG. 1, the touch electrode layer includes a plurality of touch electrodes E insulated from each other, and each touch electrodes E is connected through a signal line S.

When performing touch detection on the touch display panel, an excitation signal is inputted to each of the touch electrodes E through each signal line S, to charge each of the touch electrodes E. The touch electrode E senses the charge, and then a first signal line S1 receives a sensing signal on the touch electrode, thus the variation of the capacitance on the touch electrode is measured. Based on the variation of the capacitance before and after the touch, the horizontal and vertical coordinates are determined and then combined as plane coordinates of the touch.

Thus, in a conventional self-capacitive touch display panel, when performing the touch detection, the signal line S connected to the touch electrode E is used to transmit both the drive signal and the sensing-detection signal. For a touch electrode, the transmission of the drive signal and sensing-detection signal is implemented through a same signal line, thus, thus for the conventional self-capacitive touch display panel, the drive signal and sensing-detection signal need to be transmitted through time-sharing manner, which causes a longer time consumed in touch detection, and is disadvantageous for improving the efficiency of touch detection.

In order to illustrate the objective, technical solution, and beneficial effect more clearly and comprehensively, the implements of the disclosure are described in detail in conjunction with the drawings hereinafter.

Figure 2:
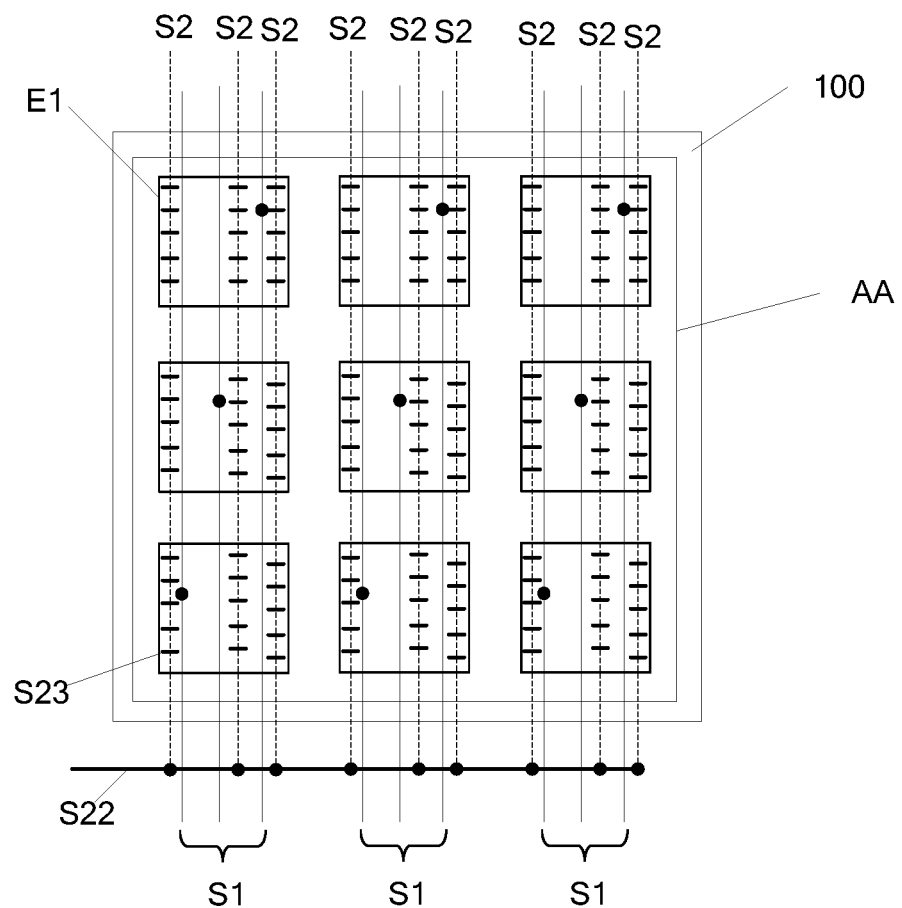
FIG. 2 is a structural diagram of a touch display panel according to an embodiment of the disclosure.

FIG. 2 is a structural diagram of a touch display panel according to a first embodiment of the disclosure. It should be noted that, the structure of the touch display panel shown in FIG. 2 is a partial structure of the touch display panel rather than the structure of the whole touch display panel. In fact, the number of touch electrodes included in a touch display panel is much more than 9. FIG. 2 is just an example of the structure of touch display panel, and it should not be interpreted that the touch display panel includes only 9 touch electrodes.

As shown in FIG. 2, the touch display panel includes a touch electrode layer 100 and a plurality of first signal lines S1, a plurality of first electrode blocks E1 are provided on the touch electrode layer 100, and each first signal line S1 is electrically connected to a corresponding first electrode block E1.

In addition, the touch display panel according to the first embodiment of the disclosure further includes a plurality of second signal lines S2, and a projection of each first electrode block in a direction perpendicular to the touch display panel includes at least one second signal line S2.

It should be noted that, the second signal line S2 in the projection of each first electrode block E1 in the direction perpendicular to the touch display panel usually is a part of a second signal line S2, i.e., in the embodiment, one second signal line S2 may locate in the projections of multiple first electrode blocks E1 in the direction perpendicular to the touch display panel.

It should be noted that, as a specific embodiment of the disclosure, the layer where the second signal lines S2 locate may be above the touch electrode layer 100 where the first electrode blocks E1 locate. In addition, the layer where the second signal lines S2 locate may be below the touch electrode layer 100 where the first electrode blocks E1 locate. In addition, the layer where the second signal lines S2 locate may be the same layer as the touch electrode layer 100.

The second signal line S2 is insulated from the first electrode block E1. Thus, the first signal line S1 electrically connected to the first electrode block E1 is insulated from the second signal line S2, and a mutual capacitor is formed in the region where the first signal line S1 crosses the second signal line S2. Thus the first signal line S1 and the second signal line S2 become two electrodes of the capacitor. When a finger touches a capacitive screen, the coupling of the two electrodes near the touch point is influenced, thus the capacitance between the two electrodes are changed.

Optionally, the capacitance between the first signal line S1 and the second signal line S2 is 1-100 times the capacitance between the first signal line S1 and the touch finger.

In the touch display panel according to the embodiment of the disclosure, an input terminal of the second signal line S2 may be connected to an output terminal of a touch-control signal source. On this occasion, the second signal line S2 is used to transmit the drive signal. The touch-control signal source may be a drive chip outside the touch display panel. When the output signal of the drive chip is a touch-control drive signal, the second signal line S2 is used to transmit the touch-control drive signal, and the first signal line S1 is used to transmit the sensing signal.

Since a mutual capacitor is formed between the first signal line S1 and the second signal line S2, when performing the touch detection on the touch display panel, the second signal line S2 sends out an excitation signal, and at the same time the first signal line S1 receives a touch-control sensing signal, thus the capacitances at all intersections between the first signal lines S1 and the second signal lines S2 may be obtained, i.e., the capacitance of the whole touch screen in the two dimensional plane may be obtained. Based on the variation of the two dimensional capacitance of the touch screen, the coordinate of each touch point may be calculated.

According to the embodiment of the disclosure, in the case that the input terminal of the second signal line S2 is connected to the touch-control signal source, when the second signal line S2 transmits the excitation signal, the first signal line S1 receives the touch-control sensing signal. The first signal line and the second signal line are two different lines, thus, in the touch display panel according to the embodiments of the disclosure, the drive signal and sensing signal may be transmitted simultaneously, and the efficiency of touch detection in the touch display panel provided in the disclosure is improved.

In a case that the input terminal of the second signal line S2 is connected to the touch-control signal source, the operating principle of the touch display panel according to the embodiment of the disclosure is the same as that of the mutual capacitive touch screen, thus, in this case, the touch display panel according to the embodiment of the disclosure is a mutual capacitive touch display panel.

As another embodiment of the disclosure, the input terminal of the second signal line S2 may be floating or be connected to a stable level. On this occasion, when performing the touch detection on the touch display panel, the first signal line S1 charges the touch electrode connected to the first signal line S1, the variation of the capacitance on the touch electrode is sensed, and then the first signal line S1 receives the sensing signal on the touch electrode, thus the variation of the capacitance on the touch electrode is measured. Based on the variation of the capacitance before and after the touch, the horizontal and vertical coordinates are determined and then combined as plane coordinates of the touch.

In a case that the second signal line S2 is floating or connected to a stable level, the operating principle of the touch display panel according to the embodiment of the disclosure is the same as that of self-capacitive touch screen. Thus, in this case, the touch display panel according to the embodiment of the disclosure is a self-capacitive touch display panel. On this occasion, the first signal line S1 is used to transmit the drive signal as well as the sensing signal.

It can be learned from the above that, the touch display panel according to the embodiment of the disclosure may be a self-capacitive touch display panel, or may be a mutual capacitive touch display panel. Thus, the touch display panel according to the embodiment of the disclosure is a self-capacitive and mutual capacitive integrated touch display panel.

It should be noted that, the self-capacitive and mutual capacitive integrated touch display panel according to the embodiment of the disclosure introduces the second signal line on the basis of conventional self-capacitive touch display panel. As compared to self-capacitive touch display panel in conventional technology, minor modification is made and the process is simple.

As a specific embodiment of the disclosure, shown in FIG. 2, the touch display panel further includes a second signal bus S22, and all the second signal lines S2 distributed across the display area are electrically connected to the second signal bus S22. One terminal of the second signal bus S22 is the signal input terminal, which may be connected to the touch-control signal source, or be floating, or be connected to a stable level.

Further, as shown in FIG. 2, the touch display panel includes a display area AA (the dotted box shown in FIG. 2 is the display area), the forgoing second signal lines S2 are disposed in the display area AA. To improve the uniformity of display of the touch display panel, the second signal lines S2 in the display area AA are in a comb-like distribution. The second signal lines S2 with a comb-like distribution are connected in parallel to the second signal bus S22. To further improve the uniformity of display of the touch display panel, a lot of branch lines S23 are provided on each second signal line S2.

Figure 3:
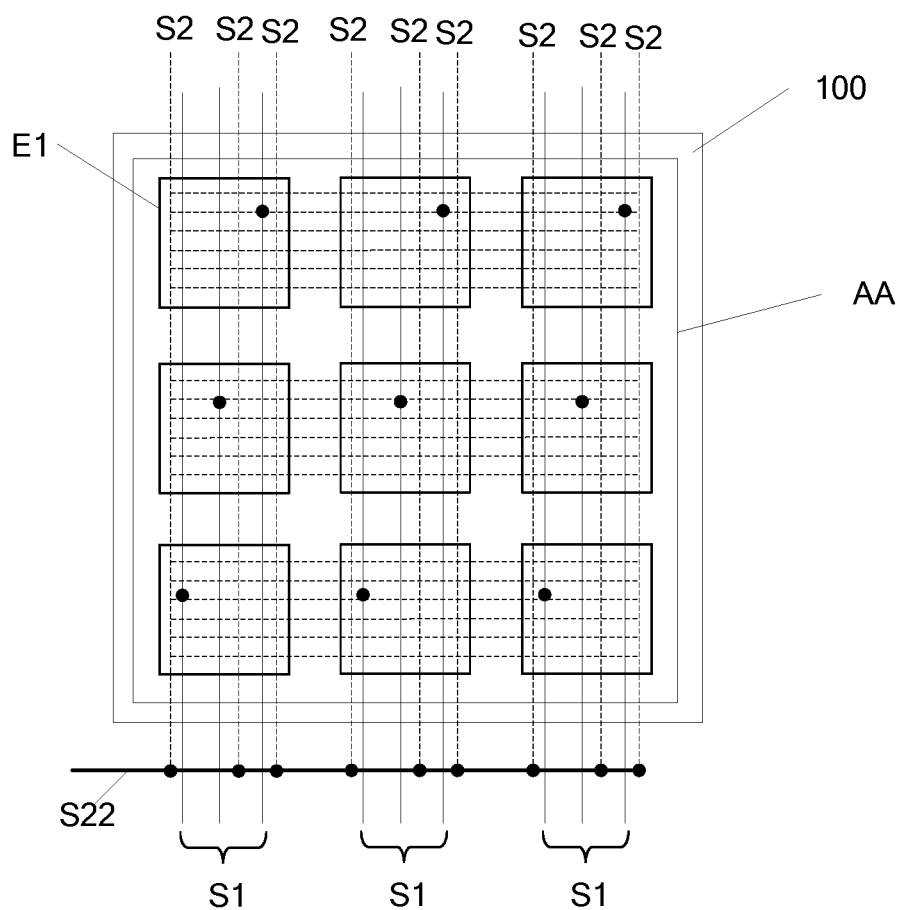
FIG. 3 is another structural diagram of a touch display panel according to an embodiment of the disclosure.

As another embodiment of the disclosure, to improve the uniformity of the touch display panel, as shown in FIG. 3, the forgoing second signal lines S2 distribute in a grid-like pattern in the display area AA. The second signal lines S2 with a grid-like distribution may increase the intersecting area with the first signal lines S1, which is advantageous for improving the mutual capacitances between the first signal lines S1 and the second signal lines S2.

Furthermore, the first signal lines S1 and the second signal lines S2 may be disposed in different conducting layers, or the first signal lines S1 and the second signal lines S2 may be alternatively disposed in a same conducting layer. Compared to the fabrication of touch display panel with the first signal lines S1 and the second signal lines S2 disposed in different conducting layers, a MASK process is saved in the fabrication of touch display panel with the first signal lines S1 and the second signal lines S2 disposed in a same conducting layer, however the wiring density is higher, which may cause large parasitic capacitances.

Further, the first signal lines S1 and the second signal lines S2 may be fabricated with different materials, for example, the first signal lines S1 are fabricated with ITO material, and the second signal lines S2 are fabricated with metal materials. Alternatively, the first signal lines S1 and the second signal lines S2 may be fabricated with same material.

It should be noted that, in the touch display panel according to the first embodiment of the disclosure, touch electrodes may be reused, thus the first electrode blocks E1 may be further used as common electrodes. For a touch display panel with reused touch electrodes, display and touch detection are driven in a time-sharing manner. During the display period, the first signal lines S1 transmit the common voltage signal, and during the period of touch detection, the first signal lines S1 transmit the drive signal for the touch-control.

In the touch display panel according to the first embodiment of the disclosure, the second signal lines S2 is added on the basis of conventional self-capacitive touch display panel, which causes trivial processes and a complicated structure of the touch display panel. Using certain dummy wires in the touch display panel as a part of the second signal lines S2 may simplify the process and structure of the touch display panel. Details may be referred to the second embodiment.

Figure 4:
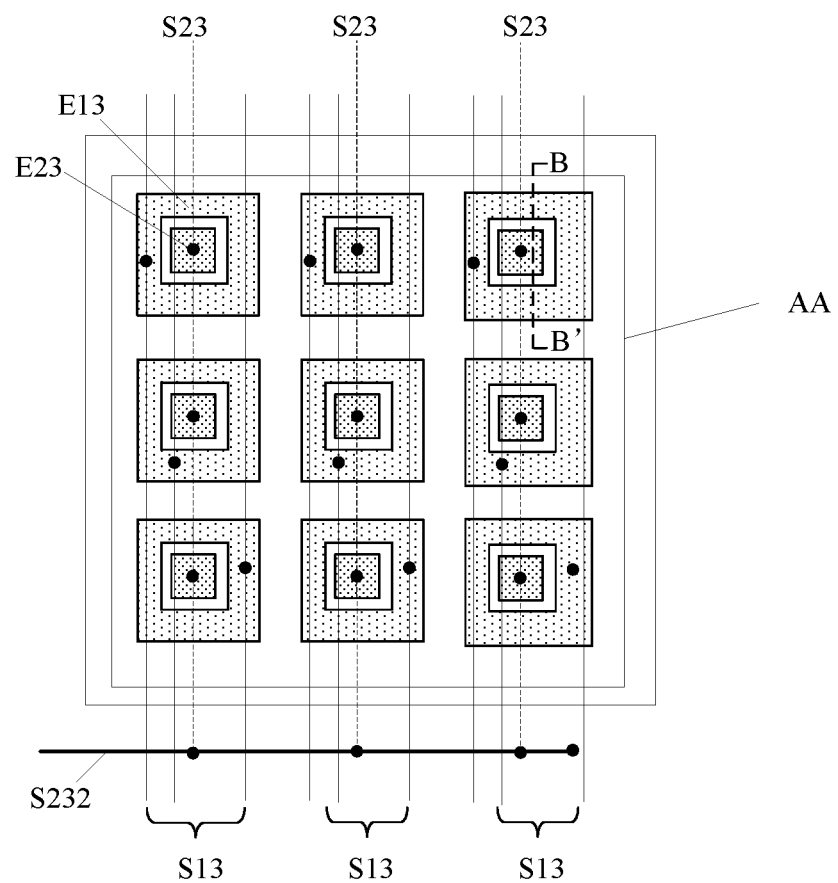
FIG. 4 is a structural diagram of a touch display panel according to an embodiment of the disclosure.

FIG. 4 is a structural diagram of the touch display panel according to an embodiment of the disclosure. As shown in FIG. 4, the touch display panel according to the second embodiment includes a plurality of first electrode blocks E13 and a plurality of first signal lines S13. In addition, the touch display panel further includes a plurality of second electrode blocks E23, and each of the first electrode blocks E13 is insulated from each of the second electrode blocks E23. Each of the first electrode blocks E13 is electrically connected to a corresponding one of the first signal lines S13.

The touch display panel shown in FIG. 4, further includes second signal lines S23, and the second electrode block E23 is electrically connected to the second signal line S23. It should be noted that, the second signal line S23 is also insulated from first electrode block E13.

In the touch display panel shown in FIG. 4, a mutual capacitor is formed in the region where the first signal line S13 together with the first electrode block E13 cross the second signal line S23 together with the second electrode block E23. The first signal line S13 together with the first electrode block E13 are equivalent to one electrode of the capacitor, and the second signal line S23 together with the second electrode block E23 are equivalent to another electrode of the capacitor.

In the case that the input terminal of the second signal line S23 is connected to the touch-control signal source, the second signal line S23 sends out the excitation signal, and at the same time the first signal line S13 receives the touch-control sensing signal simultaneously. Thus the capacitances at all intersections between the horizontal and vertical electrodes may be obtained, i.e., of the whole touch screen in the two dimensional plane may be obtained. Based on the variation of the two dimensional capacitance of the touch screen, the coordinate of each touch point may be calculated. Hence, in a case that the input terminal of the second signal line S23 is connected to the touch-control signal source, the operating principle of the touch display panel according to the embodiment of the disclosure is of the same as the mutual capacitive touch screen, thus in this case the touch display panel according to the embodiment of the disclosure is a mutual capacitive touch display panel.

As another embodiment of the disclosure, the input terminal of the second signal line S23 may be floating or be connected to a stable level. On this occasion, when performing the touch detection on the touch display panel, the first signal line S13 charges the touch electrode connected to the first signal line S13 first, the variation of the capacitance on the touch electrode is sensed, and then the first signal line S13 receives the sensing signal on the touch electrode, thus the variation of the capacitance on the touch electrode is measured. Based on the variation of the capacitance before and after the touch, the horizontal and vertical coordinates are determined and then combined as plane coordinates of the touch.

Thus, in a case that the second signal line S23 is floating or be connected to a stable level, the operating principle of the touch display panel according to the embodiment of the disclosure is the same as that of self-capacitive touch screen. Thus, in this case, the touch display panel according to the embodiment of the disclosure is a self-capacitive touch display panel. On this occasion, the first signal line S13 is used to transmit the drive signal as well as the sensing signal.

It can be learned from the above that, similar to the touch display panel according to the first embodiment, the touch display panel according to the second embodiment of the disclosure may also be a self-capacitive and mutual capacitive integrated touch display panel. In a case that the touch display panel of the disclosure operates based on the operating principle of the mutual capacitive touch display panel, the second signal line S23 is used to transmit the drive signal, and the first signal line S13 is used to transmit the sensing signal.

In a case that the touch display panel of the disclosure operates based on the operating principle of the self-capacitive touch display panel, the first signal line S13 is used to transmit the drive signal as well as the sensing signal.

Further, to reduce the number of signal input pins, all respective second electrode blocks E23 are connected together through the second signal lines S23.

Further, the touch display panel according to the disclosure includes a second signal bus S232. The second signal lines S23 distributed across the display area AA are connected in parallel to the second signal bus S232.

Further, to improve the uniformity of the touch display panel, the number of the first electrode blocks E13 equals to that of the second electrode blocks E23. The area of each of the second electrode blocks is smaller than that of the first electrode block, and each second electrode block E23 is surrounded by a first electrode block E13. Specifically, each first electrode block and the second electrode block surrounded by the first electrode block are in a position relation as a homocentric square, i.e., each of the first electrode blocks is disposed in the projection area of the corresponding second electrode block along the direction perpendicular to the touch display panel.

It should be noted that, the second electrode blocks according to the embodiment of the disclosure may be fabricated through dummy electrodes on the common electrode layer. In a case that the second electrode blocks are fabricated through dummy electrodes on the common electrode layer, the second electrode blocks and first electrode blocks are disposed in a same conducting layer, and both are disposed in the common electrode layer of the touch display panel.

In addition, besides the dummy electrodes on the common electrode layer, there are a certain number of dummy wires on the metal layer where the first signal lines S13 locate, and a certain number of dummy electrodes are provided on the conducting layer where the first signal lines S13 locate according to the embodiment of the disclosure to form the second electrode blocks. In a case that the second electrode blocks E23 are fabricated through dummy electrodes on the conducting layer where the first signal lines S13 locate, the second electrode blocks E23 and the first signal lines S13 are on the same conducting layer.

Figure 5:
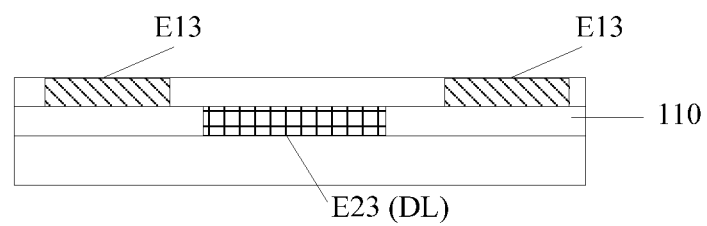
FIG. 5 is a partial schematic cross section view of a touch display panel taken along line BB' in FIG. 4 according to an embodiment of the disclosure.
Figure 6:
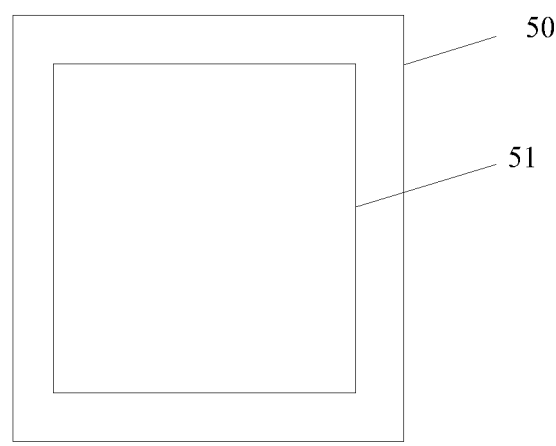
FIG. 6 is a structural diagram of a display device according to an embodiment of the disclosure.

The above is the touch display panel according to the second embodiment of the disclosure. In the touch display panel according to the second embodiment, as is shown in FIG. 5, certain dummy wires DL in the conducting layer 110 are used to fabricate the second electrode blocks E23, and the second electrode blocks are electrically connected to the second signal lines S23. In this way, in the touch display panel according to the second embodiment, the second electrode blocks E23 are equivalent to a part of the second signal lines S23 according to the first embodiment. Under the premise that the same technical effect is achieved, the number of fabricated second signal lines S23 is significantly reduced according to the embodiment of the disclosure. In this way, compared to the first embodiment, fabrication process is simplified for the touch display panel according to the second embodiment of the disclosure. Based on the touch display panel according to the first or second embodiment of the disclosure, a display device is further provided according to an embodiment of the disclosure, as shown in FIG. 6. The display device 50 includes a touch display panel 51, and the touch display panel 51 is the touch display panel according to the forgoing embodiments.

The forgoing description of the embodiments of the disclosure, is to allow those skilled in the art to implement or use the disclosure. A variety of modifications to the embodiments are apparent for those skilled in the art, and the general principles defined in the disclosure may be implemented in other embodiments without departing from the spirit and scope of the invention. Hence, the disclosure is not limited to the embodiments shown in the disclosure, but conforms to a widest scope consistent with the principles and novel features in the disclosure.

What is claimed is:

1. A touch display panel comprising:
   a touch electrode, comprising a plurality of electrode pairs arranged in rows and columns to form an array, wherein each electrode pair of the plurality of electrode pairs comprises a first electrode block and a second electrode block insulated from each other, and the first electrode block encompasses the second electrode block as a homocentric square;
   a plurality of first signal lines located in a conducting layer, wherein the conducting layer comprises a plurality of dummy wires; and
   a plurality of second signal lines connected to a same second signal bus;
   wherein both the plurality of first signal lines and the plurality of second signal lines are arranged along the column direction;
   wherein in one column of the array, each first electrode block connects to one of the plurality of first signal lines in a one-to-one association, each second electrode block connects to a same second signal line;
   wherein in one column of the array, each first electrode block overlays but insulates from a corresponding second signal line in the same column; and
   wherein the second electrode blocks are formed from the plurality of dummy wires.

2. The touch display panel according to claim 1, wherein a drive signal is applied to the plurality of second signal lines, and wherein a sensing signal is applied to the plurality of first signal lines.

3. The touch display panel according to claim 1, wherein the second signal bus is floating or connected to a stable level, and both the drive signal and the sensing signal are applied to the plurality of first signal lines.

4. The touch display panel according to claim 1, further comprising a display area, wherein the plurality of second signal lines distributes in a comb-like pattern in the display area.

5. The touch display panel according to claim 1, further comprising a display area, wherein the plurality of second signal lines distribute in a grid-like pattern in the display area.

6. The touch display panel according to claim 1, wherein the plurality of first signal lines and the plurality of second signal lines are disposed in a same conducting layer.

7. The touch display panel according to claim 1, wherein the plurality of first signal lines and the plurality of second signal lines are disposed in different conducting layers.

8. The touch display panel according to claim 1, wherein a material of the plurality of first signal lines is ITO.

9. The touch display panel according to claim 1, wherein a material of the plurality of second signal lines is metal.

10. The touch display panel according to claim 1, wherein the plurality of second electrode blocks are electrically connected through the second signal bus.

11. The touch display panel according to claim 1, wherein the second electrode blocks and the plurality of first signal lines are disposed in a same conducting layer, or the second electrode blocks and a common electrode layer are disposed in a same conducting layer.

12. The touch display panel according to claim 1, wherein an area of each of the second electrode blocks is smaller than that of the first electrode block.

13. The touch display panel according to claim 12, wherein each of the first electrode blocks is disposed in a projection area of the corresponding second electrode block along the direction perpendicular to the touch display panel.

14. A display device comprising a touch display panel, wherein the touch display panel comprises:
- a touch electrode, comprising a plurality of electrode pairs arranged in rows and columns to form an array, wherein each electrode pair of the plurality of electrode pairs comprises a first electrode block and a second electrode block insulated from each other, and the first electrode block encompasses the second electrode block as a homocentric square;
- a plurality of first signal lines located in a conducting layer, wherein the conducting layer comprises a plurality of dummy wires; and
- a plurality of second signal lines each connected to a same second signal bus;
- wherein both the plurality of first signal lines and the plurality of second signal lines are arranged along the column direction;
- wherein in one column of the array, each first electrode block connects to one of the plurality of first signal lines in a one-to-one association, each second electrode block connects to a same second signal line;
- wherein in one column of the array, each first electrode block overlays but insulates from a corresponding second signal line in the same column; and
- wherein the second electrode blocks are formed from the plurality of dummy wires.

* * * * *